(12) United States Patent
Cook et al.

(10) Patent No.: US 8,832,758 B2
(45) Date of Patent: Sep. 9, 2014

(54) METHODS AND SYSTEMS FOR PROVIDING VIDEO ON DEMAND

(75) Inventors: Charles I Cook, Louisville, CO (US); Bruce A Phillips, Erie, CO (US); Kurt A Campbell, Lafayette, CO (US); Donald L Brodigan, Broomfield, CO (US); Steven M Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 1573 days.

(21) Appl. No.: 10/391,518

(22) Filed: Mar. 17, 2003

(65) Prior Publication Data
US 2004/0187160 A1   Sep. 23, 2004

(51) Int. Cl.
*H04N 7/173* (2011.01)
*H04N 21/234* (2011.01)
*H04N 21/2387* (2011.01)
*H04N 21/472* (2011.01)
*H04N 21/2385* (2011.01)
*H04N 21/845* (2011.01)
*H04N 21/2225* (2011.01)

(52) U.S. Cl.
CPC ..... *H04N 21/23406* (2013.01); *H04N 21/2387* (2013.01); *H04N 21/47202* (2013.01); *H04N 21/2385* (2013.01); *H04N 21/8456* (2013.01); *H04N 21/2225* (2013.01); *H04N 7/17336* (2013.01)
USPC ............... 725/94; 725/86; 725/87; 725/88; 725/90; 725/91; 725/93; 725/98; 725/114; 725/115; 725/116

(58) Field of Classification Search
USPC .................. 725/86, 87, 94–96, 115, 145
See application file for complete search history.

(56) References Cited

U.S. PATENT DOCUMENTS

| | | | | |
|---|---|---|---|---|
| 5,132,992 A * | 7/1992 | Yurt et al. | ...... | 375/240 |
| 5,583,561 A * | 12/1996 | Baker et al. | ...... | 725/93 |
| 5,659,539 A * | 8/1997 | Porter et al. | ...... | 709/231 |
| 5,696,905 A * | 12/1997 | Reimer et al. | ...... | 705/27 |
| 5,757,417 A * | 5/1998 | Aras et al. | ...... | 725/14 |
| 5,764,893 A * | 6/1998 | Okamoto et al. | ...... | 709/231 |
| 5,793,971 A * | 8/1998 | Fujita et al. | ...... | 725/101 |
| 5,815,146 A * | 9/1998 | Youden et al. | ...... | 715/720 |
| 5,815,662 A * | 9/1998 | Ong | ...... | 725/92 |
| 5,862,312 A * | 1/1999 | Mann et al. | ...... | 714/6 |
| 5,898,456 A * | 4/1999 | Wahl | ...... | 725/91 |
| 5,905,845 A * | 5/1999 | Okada et al. | ...... | 386/244 |
| 5,924,116 A * | 7/1999 | Aggarwal et al. | ...... | 711/122 |
| 5,940,738 A * | 8/1999 | Rao | ...... | 725/103 |
| 5,974,503 A * | 10/1999 | Venkatesh et al. | ...... | 711/114 |
| 6,081,840 A * | 6/2000 | Zhao | ...... | 709/224 |
| 6,112,226 A * | 8/2000 | Weaver et al. | ...... | 709/203 |
| 6,138,221 A * | 10/2000 | Korst et al. | ...... | 711/167 |
| 6,144,375 A * | 11/2000 | Jain et al. | ...... | 715/500.1 |
| 6,192,186 B1 * | 2/2001 | Murashima et al. | ...... | 386/68 |

(Continued)

*Primary Examiner* — An Son P Huynh
(74) *Attorney, Agent, or Firm* — Swanson & Bratschun, L.L.C.

(57) ABSTRACT

Methods and systems provide a selected video segment to customer premises equipment. A request is received from the customer premises equipment for transmission of the selected video segment. A copy of the selected video segment is transferred to one of a plurality of buffers. One of the plurality of buffers is mapped through a routing network to a port interfaced with the customer premises equipment. The selected video segment is transmitted from the one of the plurality of buffers through the routing network and port to the customer premises equipment.

23 Claims, 4 Drawing Sheets

(56) References Cited

U.S. PATENT DOCUMENTS

| | | | |
|---|---|---|---|
| 6,226,793 B1 * | 5/2001 | Kwoh | 725/28 |
| 6,286,143 B1 * | 9/2001 | Asamizuya et al. | 725/92 |
| 6,321,381 B1 * | 11/2001 | Yuen et al. | 725/28 |
| 6,378,130 B1 * | 4/2002 | Adams | 725/95 |
| 6,381,746 B1 * | 4/2002 | Urry | 725/87 |
| 6,385,771 B1 * | 5/2002 | Gordon | 725/90 |
| 6,401,126 B1 * | 6/2002 | Douceur et al. | 709/231 |
| 6,463,444 B1 * | 10/2002 | Jain et al. | 1/1 |
| 6,543,053 B1 * | 4/2003 | Li et al. | 725/88 |
| 6,557,030 B1 * | 4/2003 | Hoang | 709/217 |
| 6,570,070 B1 * | 5/2003 | Nakajima et al. | 800/300 |
| 6,704,491 B1 * | 3/2004 | Revis | 386/261 |
| 6,714,723 B2 * | 3/2004 | Abecassis | 386/239 |
| 6,796,555 B1 * | 9/2004 | Blahut | 370/395.1 |
| 6,829,781 B1 * | 12/2004 | Bhagavath et al. | 725/94 |
| 6,877,010 B2 * | 4/2005 | Smith-Semedo et al. | 707/102 |
| 6,882,793 B1 * | 4/2005 | Fu et al. | 386/241 |
| 6,925,499 B1 * | 8/2005 | Chen et al. | 709/226 |
| 6,944,585 B1 * | 9/2005 | Pawson | 703/22 |
| 6,973,461 B1 * | 12/2005 | Fleming et al. | 386/334 |
| 6,973,666 B1 * | 12/2005 | Jacobs et al. | 725/87 |
| 7,028,096 B1 * | 4/2006 | Lee | 709/231 |
| 7,080,400 B1 * | 7/2006 | Navar | 725/139 |
| 7,093,191 B1 * | 8/2006 | Jain et al. | 715/201 |
| 7,143,433 B1 * | 11/2006 | Duan et al. | 725/115 |
| 7,155,735 B1 * | 12/2006 | Ngo et al. | 725/101 |
| 7,188,357 B1 * | 3/2007 | Rieschl et al. | 725/92 |
| 7,293,279 B1 * | 11/2007 | Asmussen | 725/102 |
| 7,440,674 B2 * | 10/2008 | Plotnick et al. | 386/68 |
| 2001/0014975 A1 * | 8/2001 | Gordon et al. | 725/91 |
| 2001/0018693 A1 * | 8/2001 | Jain et al. | 707/500 |
| 2001/0025377 A1 * | 9/2001 | Hinderks | 725/109 |
| 2002/0049977 A1 * | 4/2002 | Miller et al. | 725/82 |
| 2002/0059394 A1 * | 5/2002 | Sanders | 709/217 |
| 2002/0059619 A1 * | 5/2002 | Lebar | 725/87 |
| 2002/0069420 A1 * | 6/2002 | Russell et al. | 725/92 |
| 2002/0078174 A1 * | 6/2002 | Sim et al. | 709/219 |
| 2002/0147782 A1 * | 10/2002 | Dimitrova et al. | 709/207 |
| 2002/0152318 A1 * | 10/2002 | Menon et al. | 709/231 |
| 2002/0199188 A1 * | 12/2002 | Sie et al. | 725/35 |
| 2003/0005457 A1 * | 1/2003 | Faibish et al. | 725/94 |
| 2003/0028884 A1 * | 2/2003 | Swart et al. | 725/51 |
| 2003/0074670 A1 * | 4/2003 | Penk et al. | 725/96 |
| 2003/0115421 A1 * | 6/2003 | McHenry et al. | 711/133 |
| 2003/0118243 A1 * | 6/2003 | Sezer et al. | 382/245 |
| 2003/0131350 A1 * | 7/2003 | Peiffer et al. | 725/18 |
| 2003/0204856 A1 * | 10/2003 | Buxton | 725/120 |
| 2004/0103437 A1 * | 5/2004 | Allegrezza et al. | 725/95 |
| 2006/0029038 A1 * | 2/2006 | Jungck | 370/351 |
| 2006/0184979 A1 * | 8/2006 | Bayrakeri et al. | 725/87 |
| 2007/0033533 A1 * | 2/2007 | Sull | 715/752 |
| 2009/0282444 A1 * | 11/2009 | Laksono et al. | 725/89 |

\* cited by examiner

METHODS AND SYSTEMS FOR PROVIDING VIDEO ON DEMAND

BACKGROUND OF THE INVENTION

This application relates generally to providing video programming to customer premises. More specifically, this application relates to providing video programming to customer premises on demand by customers.

In recent years, there has been steadily increasing consumer demand for video-on-demand programming. In broad terms, "video-on-demand" refers to programming functionality that permits a customer to order a particular video program at his convenience, without the constraint of a predetermined broadcast schedule. Such video-on-demand programs have been available for some time now in settings where the potential number of viewers is relatively small. For example, many hotels now offer a portion of their programming on a video-on-demand basis so that guests may view such programming at their convenience.

Extension of video-on-demand services to large populations has been hampered by the need to ensure availability of the programs to large numbers of customers, many of whom may wish to view the same program near, but not exactly at, the same time. While relatively small numbers of customers may be accommodated by providing a dedicated video stream for each user of the system regardless of whether multiple users are viewing the same content, this approach quickly becomes unmanageable as the number of users increases. Providing such dedicated video streams results in a need to maintain multiple copies of the same content, thereby creating tremendous distribution requirements in the network that services the users. For large distribution systems, such as might be provided by cable-television systems, the resulting complexity has acted as a barrier to widespread implementation of full video-on-demand services. Instead, some implementations have attempted to provide much more limited versions that mimic aspects of video-on-demand services, without providing the full functionality being demanded by consumers.

There is accordingly a need in the art for methods and systems for providing video on demand that avoid these limitations.

BRIEF SUMMARY OF THE INVENTION

Embodiments of the invention thus provide methods and systems for providing video on demand. From the perspective of a customer of the video-on-demand service, these embodiments permit the customer to specify a video segment that he wishes to watch and to have that video segment transmitted to his premises at the time he desires. During the transmission of the video segment, the customer may exert control over the transmission of the segment with commands such as fast-forward, reverse, freeze-frame, slow-motion, and the like. In addition to meeting these demands by customers, the implementation of the services may be performed without certain limitations of the prior art.

In one set of embodiments, a method provides a selected video segment to customer premises equipment. A request is received from the customer premises equipment for transmission of the selected video segment. A copy of the selected video segment is transferred to one of a plurality of buffers. One of the plurality of buffers is mapped through a routing network to a port interfaced with the customer premises equipment. The selected video segment is transmitted from the one of the plurality of buffers through the routing network and port to the customer premises equipment. In some instances, the selected video segment may comprise a selected video program.

In some such embodiments, transmitting the selected video segment is performed substantially contemporaneously with receiving the request for transmission of the selected video segment. In other embodiments, a request for the copy of the selected video segment is transmitted to a central video library that comprises the selected video segment. The request for the copy may comprise indexing information for the selected video segment. In other embodiments, the copy of the selected video segment is received from a central video library that comprises the selected video segment. In further embodiments, a transmission instruction may be received from the customer premises equipment, with transmission of the selected video segment being modified in accordance with the transmission instruction. In some embodiments, the copy of the selected video segment may be deleted from the one of the plurality of buffers. In other embodiments, the copy of the selected video segment may be maintained in a video library local to the plurality of buffers.

Methods of the invention may accommodate multiple transmissions of the video. For example, in a further embodiment, a second request for transmission of the selected video segment is received from a second customer premises. A second copy of the selected video segment is transferred to a second of the plurality of buffers. The second plurality of buffers is mapped through the routing network to a port interfaced with the second customer premises. The selected video segment is transmitted from the second plurality of buffers through the routing network and second port to the second customer premises equipment. Transmitting the selected video segment from the second of the plurality of buffers may be time-shifted with respect to transmitting the selected video segment from the one of the plurality of buffers. In addition, methods of the invention may combine multiple video segments. In such embodiments the selected video program is combined with a second video program, and a combination of the selected video program and second video program is transferred to the one of the plurality of buffers.

In another set of embodiments, a system provides a selected video segment to customer premises equipment. The system comprises a content-transfer server interfaced with a head end having a central video library that houses a copy of the selected video segment. The content-transfer server is adapted to generate multiple streams of content received from the head end and to control transmission of the multiple streams of content in accordance with transmission instructions received from the customer premises equipment. The system may also comprise a routing network interfaced with the content-transfer server and adapted to implement a mapping of the multiple streams of content. A plurality of ports are adapted to transmit the mapped streams of content over a transmission medium, with one of the plurality of ports being interfaced with the customer premises equipment with the transmission medium.

The transmission instructions may, for example, comprise a request for transmission of the selected video segment or a request to modify transmission of the selected video segment. In some instances a plurality of content-transfer servers may be used. In some cases, a plurality of routing networks may also be used, with each of the routing networks interfaced with one of the content-transfer servers. The content-transfer server may comprise a local video library adapted to store a copy of the selected video segment. A plurality of buffers are adapted to exchange content with the routing network. An index module may be then be used to load frames of the selected video segment from the local video library into the buffers. In one embodiment, the index module is adapted to load frames into different buffers on a time-shifted basis.

In a further set of embodiments, a system provides video programming. A head end is provided with a central video library that houses a plurality of video segments. A plurality of node terminals are adapted to exchange content with a plurality of customer premises equipment, and a distribution network is provided to interface the head end with the plurality of node terminals. Each of the node terminals is adapted to retrieve a copy of a selected video segment from the head end in response to a request for transmission of the selected video segment from one of the plurality of customer premises equipment. In addition, the node terminal transmits the selected video segment to the one of the plurality of customer premises equipment at a time specified by the request.

In some such embodiments, the head end may further comprise an index framer in communication with the central video library and adapted to encode each of the plurality of video segments into indexed frames. At least one of the node terminals may comprise a content-transfer server adapted to generate multiple streams of content received from the head end and to control transmission of the multiple streams of content in accordance with transmission instructions received from the customer premises equipment. In addition, that node terminal may comprise a plurality of ports adapted to transmit the multiple streams of content over transmission media to the customer premises equipment. In some instances, that node terminal may additionally comprise a routing network adapted to implement a mapping of the multiple streams from the content-transfer server to the plurality of ports. In addition, that node terminal may comprise a local video library adapted to store a copy of at least one of the plurality of video segments. A plurality of buffers adapted to exchange content with the routing network may also be provided, with an index module adapted to load frames from the local video library into the buffers.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Embodiments of the invention provide methods and systems for providing a selected video segment to customer premises equipment. These embodiments permit the use of a single source of the selected video segment, although as is evident from the discussion below, the use of a single source is not a requirement of the invention and alternative embodiments may use multiple source copies of the selected video segment. As used herein, a "video segment" may form part or all of a video program, and is intended to refer to content that includes a video component, although it may include other components such as audio components, and may be configured for interactivity with a user, changing in response to commands received from the user.

Figure 1:
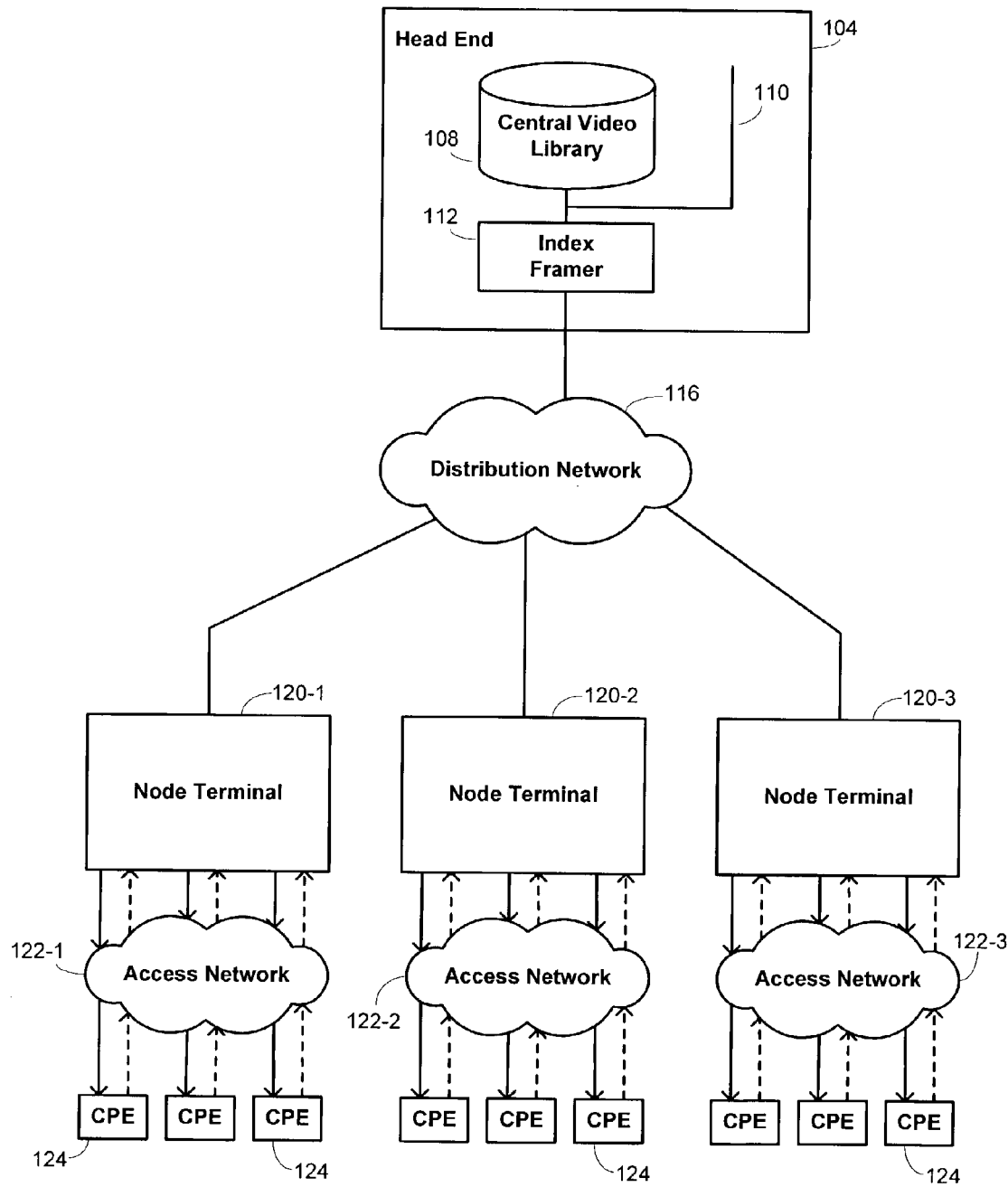
FIG. 1 is a schematic block diagram providing a structural overview of embodiments of the invention.

A structural overview of embodiments of the invention is provided with the schematic block diagram of FIG. 1, which illustrates a network arrangement in which video programming may be provided on an on-demand basis to customers. The customers interact with the network through customer premises equipment 124, which correspond to devices located at customer premises and configured for interfacing with the network arrangement. They may comprise, for example, modems, residential gateways, business gateways, set-top boxes, and the like. Examples of how the interaction with the customer premises equipment 124 is used in embodiments of the invention is described in greater detail below.

In the embodiments illustrated in FIG. 1, content that is to be made available for distribution to users of the system is collected and stored by a service provider at a head end 104. The head end 104 may include a central video library 108 where the actual copies of the content are maintained. Some of the content maintained on the central video library 108 may be archival in nature, in that it is to be maintained indefinitely. Typical archival content may include, for example, movies that are expected to be requested by users over indefinitely long periods of time. Some of the content maintained on the central video library 108 may instead intentionally be maintained only for a predetermined period of time. For example, a provider of television programming may make episodes of television programs available for a month on a video-on-demand basis, continually updating the stored content as new episodes become available. This content could alternatively be provided as a sliding window of broadcast content—if the window is seven days long, for example, content from day 1 is replaced with new content on day 8, content from day 2 is replaced with new content on day 9, etc. Alternatively or in addition to the central video library 108, the head end 104 may comprise a feed 110 for transmission of unrecorded material, such as for transmission of a "live" broadcast.

The head end 104 may also include an index framer 112, which is configured to format the content so that it may be indexed for easier retrieval. The frames may be time-based, scene-based, a combination of time- and scene-based, and the like. The granularity of the indexing may affect the level of control that a user may have on modifying transmission of the content as described below. While the index framer 112 is shown in the exemplary embodiment disposed after the central video library 108 along the transmission route from the central video library 108 to customer premises equipment 124, it may in alternative embodiments be disposed before the central video library 108. Disposition before the central video library 108 has the advantage that video segments may be encoded into frames and indexed before a request is received for a selected video segment, permitting such a request to be addressed more efficiently. Normally, the video segment is encoded into frames and indexed to facilitate coordination of subsequent retrieval. In some embodiments, supplementary classification information may additionally be associated with each of the video segments to make it easier for a user to identify a selected video segment. Merely by way of example, the classification information could include an alphabetic arrangement of the titles of the video segments; could include category information, such as "Drama," "Comedy," "Romance," and the like; could include ratings information, such as "G," "PG," "PG-13," "R" "NC-17," and the like; could include a quality index such as might be calculated from averages of reviews of the content by recognized newspaper sources; and so forth. In some instances, the index framer may be adapted to index objectionable scenes and/or language, permitting that material to be bypassed during transmission as part of a parental-control feature.

The head end 104 may be interfaced with the remainder of the network through a distribution network 116, which is configured to provide distribution connections between the head end and smaller nodes in the network. The distribution network 116 may be provided using any suitable transport media known to those of skill in the art. For example, it may be provided as a fiber-based distribution network, as a copper-based distribution network, or as a wireless distribution network. Node terminals 120 may be provided at the smaller nodes of the network to coordinate distribution of content originating from the head end 104 to users of the system. While FIG. 1 illustrates distribution directly from the distribution network 116 to the node terminals 120, the distribution may alternatively be performed in multiple stages using tree and branch configurations. Irrespective of the form of the distribution, in some embodiments, the node terminal 120 corresponds to the last network element before the customer premises is reached. In other embodiments, the customer may instead be served from a central office or other point in the network.

The interaction between the user and the network thus takes place in the form of interaction between the customer premises equipment 124 and one of the node terminals 120, usually through an access network 122 that may comprise, for example, a copper-based, fiber-based, or wireless based network. FIG. 1 illustrates that such interaction may be bidirectional, with solid-line arrows being used to designate transmission of information from a node terminal 120 to customer premises equipment 124 and dashed-line arrows being used to designate transmission in the opposite direction from the customer premises equipment 124 to the node terminal 120. Examples of information that may be transmitted from the node terminals 120 to the customer premises equipment 124 include the selected video segment itself, as well as information used to communicate indexing information, viewing costs, and the like to users. Examples of information that may be transmitted from the customer premises equipment 124 to the node terminal 120 include selection information to identify a selected video segment, transmission instructions that may be used to control transmission of the selected video segment with fast-forward, reverse, freeze-frame, start, stop, slow-motion, fast-motion, and similar controls, instructions that may be transmitted by the user as part of an interactive video programming, and the like. In one embodiment, the information transmitted from the customer premises equipment 124 to the node terminal 120 comprises a purchase request. In response, a copy of the content may be mailed to the customer or downloaded to be burned onto a medium by the customer locally.

Figure 2:
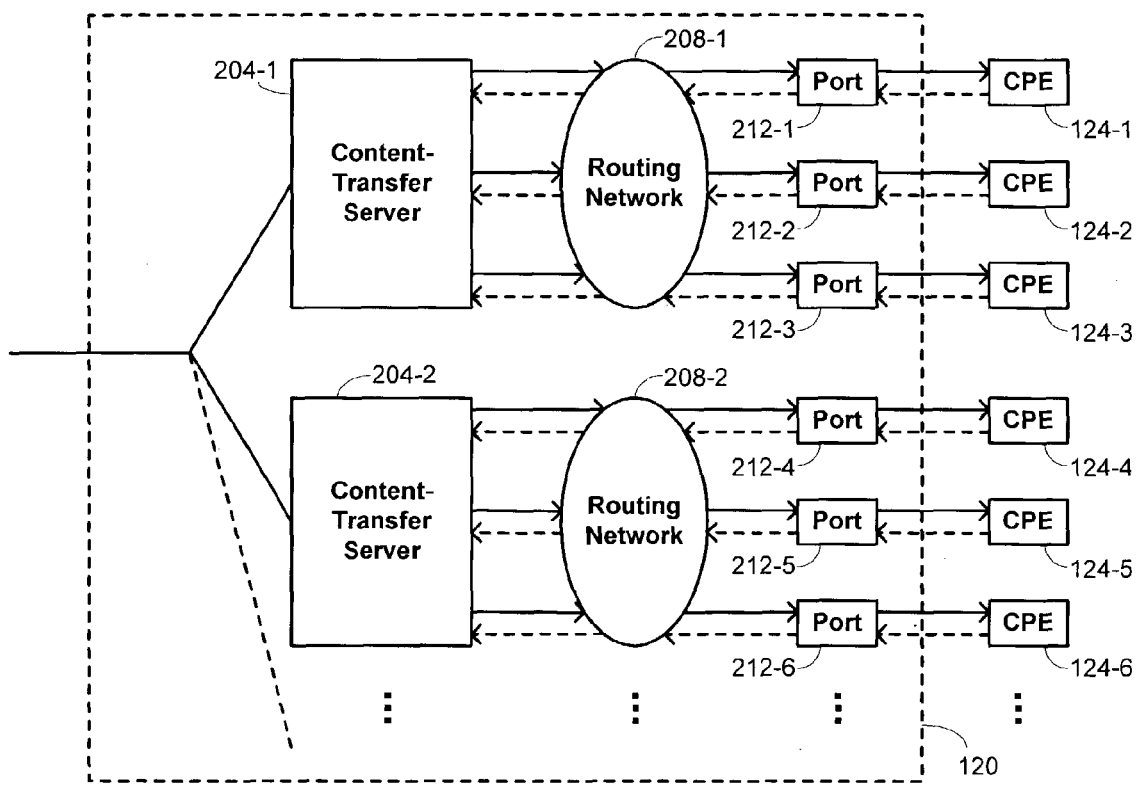
FIG. 2 is a schematic block diagram illustrating a structure of a node terminal used in embodiments of the invention.

FIG. 2 provides a block diagram that illustrates a structure for the node terminal 120 in an embodiment. One or more content-transfer servers 204 are provided, each of which is a module configured functionally to load a copy of a video segment and generate multiple streams from that copy. The multiple streams may or may not be time shifted, as described in further detail below in connection with FIG. 5. In some embodiments, the time shifting is implemented in accordance with transmission instructions received from the user. The number of content-transfer servers 204 that may be comprised by the node terminal 120 may depend on such factors as the capacity needs for portions of the system associated with the corresponding node or the number of simultaneous broadcast channels. The multiple streams output by the content-transfer server 204 are routed by a routing network 208 to a plurality of ports 212, with the mapping from the server 204 to the ports 212 being determined in accordance with customer programming requests. The ports 212 act to place the content of a selected video segment on the appropriate physical-layer medium, i.e. copper, fiber, wireless, and the like, for transmission to the corresponding customer premises equipment 124. While the illustration of the node terminal 120 in FIG. 2 shows a separate routing network 208 associated with each content-transfer server 204, such an association is not required and alternative embodiments may have multiple routing networks 208 associated with each content-transfer server 204 or may have a single multiple routing network 208 associated with a plurality of content-transfer servers 204. In another alternative embodiment, the functionality of the ports 212 is integrated with the customer premises equipment 124, with the distribution network thereby 112 incorporating functions of the access network(s) 122.

Figure 3:
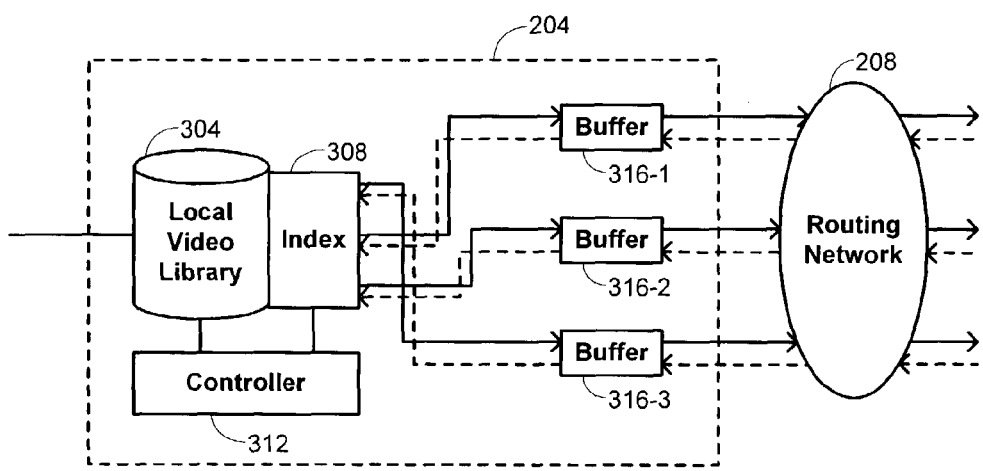
FIG. 3 is a schematic block diagram illustrating a structure of a single-program content-transfer server used in embodiments of the invention.

A structure for a content-transfer server 204 is illustrated with the schematic block diagram provided in FIG. 3. A local video library is provided to store an indexed copy of a video segment that is to be transmitted to customer premises equipment 124 in accordance with instructions from a customer. An index module 308 is provided to effect loading of frames of the video segment into a plurality of buffers 316, each of which is configured to store and queue the frames for subsequent routing to the ports 212 through the routing network 208. Loading of the frames from the local video library 304 to the buffers 316 is simplified by the indexing of the frames. In some embodiments, the buffers 316 themselves may be sub-indexed to provide finer granularity by defining subframes, which may be desirable in applications that include freeze-frame or slow-motion capabilities. In some alternative embodiments, sub-indexing is instead provided by the index module 308 with finer granularity.

Operation of the local video library 304 and the index module 308 may be coordinated by a controller 312, which may, for example, be any type of microprocessor known to those of skill in the art. In addition, the controller 312 may be adapted to keep the buffers 316 relatively full, or may flush the buffers 316 as needed to respond to transmission-modification commands such as fast-forward and rewind. The controller 312 may be adapted to duplicate data for implementing freeze-frame and slow-motion functions, or may be adapted to drop frames to implement fast-motion functions. In a particular set of embodiments, the controller 312 is adapted to combine multiple content streams into a single buffer. Such combination may be used to support picture-in-picture applications, to support the transmission of banners or other multimedia objects, or even to permit simultaneous transmission of a web browser to permit web surfing while viewing a video segment.

Figure 4:
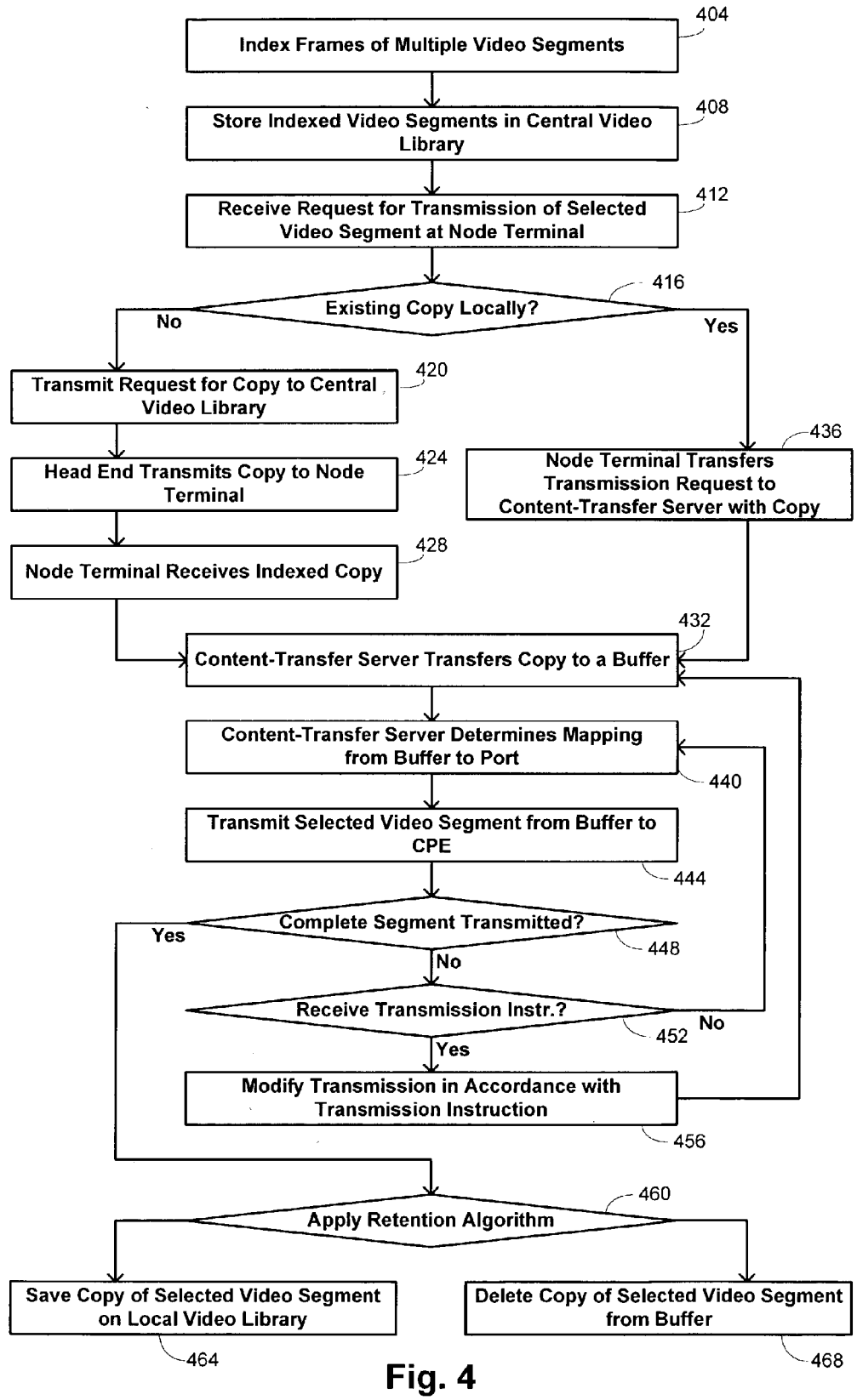
FIG. 4 is a flow diagram summarizing methods used in embodiments of the invention.

FIG. 4 provides a flow diagram that summarizes a variety of embodiments that are enabled by the structures described in connection with FIGS. 1-3 to provide a selected video segment to customer premises equipment. At block 404, frames of multiple video segments are indexed by the index framer 112 to facilitate coordinating retrieval and transmission of the video segments in accordance with embodiments of the invention. At block 408, the indexed video segments are stored in the central video library 108 comprised by the head end 104. The resulting store of indexed video segments maintained by the central video library 108 is then ready for distribution to the customer premises equipment 124 in response to requests from users. It is sufficient in some embodiments for the central video library 108 to comprise a single copy of each video segment offered to users.

When a request is received from a user, as noted at block 412, the request is processed by one of the node terminals 120. At block 416, the node terminal 120 that receives the request determines whether a copy of the selected video segment already exists locally at the node terminal 120. Such a copy may exist locally because it has recently been requested by another user and is being transmitted to the other user, or may exist locally within a local video library 304 comprised by one of the content-transfer servers 204 because application of a retention algorithm indicated that a copy of that video segment should be maintained locally. The use of such a retention algorithm is discussed further below. In some embodiments, the architecture is used to store a distributed library in the local video libraries 304 instead of maintaining the central library 108 at the head end 104.

If no copy exists local to the node terminal 120, a request for a copy of the selected video segment is transmitted to the central video library at block 420. In response to the request, the head end 104 retrieves the selected video segment from the central video library 108 and transmits a copy of it to the node terminal at block 424. Upon receipt of the copy of the selected video segment at block 428, the node terminal 120 downloads the indexed copy to the local video library 304 of one of its available content-transfer servers 204, which in turn transfers the indexed copy or portion thereof to one of its buffers 316 at block 432. The content-transfer server need not wait for receipt of a complet copy of the selected video segment before it begins to generate multiple streams, but preferably receives the content at a faster rate than it will be viewed at the customer premises equipment 124. It is similarly preferable that the rate of the transfer to one of the buffers 316 be high, particularly at a sufficient rate to avoid a buffer under-run while the user is viewing the selected video segment. In embodiments where the rate of transfer is many times the speed of playback of the selected video segment, the user will advantageously be able to access any part of the segment without significant delay.

In an alternative embodiment, the controller 312 loads a portion of a video segment into, a buffer 316, the contents of which are transmitted over the access network 122 to the customer premises equipment 124. As the buffer 316 empties, it signals back to the controller 312, which causes another portion of the video segment to be loaded. When full, the buffer 316 signals back to the controller 312 to wait. If there is a transmission-control request such as a rewind or fast-forward request, the controller 312 may insert content reflecting the requested action, flush the buffer of the data that are no longer appropriate, and begin to fill the buffer 316 with data from the newly requested index point.

If it is instead determined at block 416 that a copy of the selected video segment does exist local to the node terminal 120, then the node terminal 120 may simply transfer the transmission request to the content-transfer server 204 that already has a copy of the selected video segment at block 436. Transferring the customer's request for transmission of the selected video segment in this manner is more efficient than transferring a new copy of the selected video segment. At block 432, the content-transfer server 204 transfers a copy of the selected video segment to a buffer 316 from the local video library 304. In some instances, the presence of the locally available copy signals that the content-transfer server 204 is already serving at least one other customer and transmitting the selected video segment to that customer. Accordingly, additional transmission of the selected video segment through another buffer 316 of the content-transfer server 204 results in the content-transfer server 204 serving multiple customers simultaneously by transferring the selected video segment to respective buffers 316. The frame indexing of the selected video segment permits receipt of the segment by those multiple customers to be time-shifted, and for each of those customers to exert independent control over their respective transmissions independently.

At block 440, the content-transfer server 204 determines a mapping from the buffer 316 to which the selected video segment is being transmitted to a port 212 interfaced with the customer premises equipment 124 through an appropriate physical layer medium. This mapping is then used to effect transmission of the selected video segment from the buffer 316 to the customer premises equipment 124 over the routing network 208 internal to the node terminal 120 at block 444. Transmission may be requested by the customer immediately or may be requested at a later specified time. When transmission of the segment begins at block 444 substantially contemporaneously with receipt of the request for transmission at block 412, i.e. after no more than a few seconds or minutes, the transmission corresponds to a "live" video-on-demand presentation. In other instances, where there is a substantial time gap between the two, the transmission corresponds to a "preprogrammed" video-on-demand presentation; such a preprogramming feature allows a customer to conveniently order a selected video segment at one time in the day for viewing at a later time or even on a different day. In normal operation, the transmission at block 444 will be at substantially the normal playback rate of the selected video segment so that it may be viewed by the customer at the customer premises. In some instances, the customer may be provided with additional control over the transmission, such as by mimicking the controls that are provided by a video-cassette or digital versatile disk ("DVD") player.

In particular, the node terminal 120 monitors at block 448 whether transmission of the selected video segment has been completed, either because all of the frames have been transmitted to the customer premises equipment 124 or because an instruction to end transmission has been received from the customer via the customer premises equipment 124. As long as transmission of the selected video segment continues, the node terminal 120 monitors at block 452 for the receipt of a transmission instruction from the customer via the customer premises equipment 124. Such a transmission instruction may correspond, for example, to a fast-forward, rewind, repeat, freeze-frame, resume-play, slow-motion, or similar command. A further example of such a transmission instruction is to jump to a particular specified frame according to the indexing of the selected video segment.

Effect may be given to each of these commands at block 456 by a modification in the transmission that is implemented with a change in playback speed, playback direction, and/or playback point. For example, a fast-forward function may be implemented by increasing the speed of transmission from the corresponding buffer 316 in the normal playback direction. Alternatively, a fast-forward function may be implemented by dropping a fraction of the frames and duplicating remaining frames. A rewind function may be implemented by an increased speed of transmission in the opposite playback direction or by a dropping of frames. A repeat function may be implemented by shifting to a preceding playback point and then continuing transmission at normal speed in the normal playback direction. A freeze-frame function may be implemented by continuously transmitting a specific frame with zero playback speed until a contrary transmission instruction is received, such as a resume-play command, which may be implemented by resuming transmission at normal speed in the normal playback direction. A slow-motion function may be implemented by reducing the playback speed while maintaining the normal playback direction. A jump function may be implemented similarly to a repeat function by shifting to a specified playback point, either preceding or subsequent to the current playback point, and continuing transmission at normal speed in the normal playback direction. In some embodiments, these functions may be enhanced by using a subindexing capability of the buffer 316 or index module 308, particularly for functions such as freeze-frame and slow-motion functions.

In some instances, the actual content of the selected video segment may be dependent on receipt of a transmission instruction. For example, when the selected video segment is an interactive video segment, there may be a number of decision points at which different paths may be selected for presentation of the selected video segment depending on a response by the user. In these embodiments, giving effect to receipt of the transmission instruction thus results in a determination of which content to transmit to the user.

Once transmission of the selected video segment has been completed, as checked at block 448, a decision may be made at block 460 whether to retain a copy of the selected video segment in the local video library 304 even when no user is currently viewing that segment. Depending on the type of retention algorithm being applied at block 460, the selected video segment is either stored at block 464 or deleted at block 468. In some embodiments, the advantage to keeping space available for other segments as they are requested by users may be exploited by always deleting the copy after transmission if it has been completed. There are, however, also advantages to maintaining a local copy, particularly in increasing the efficiency with which transmission may be begun in response to a request from a user. Accordingly, many embodiments apply a retention algorithm that selectively attempts to identify which video segments are likely to be in high demand in the near future. Such algorithms may, for example, dictate retention of any video segment that has been released within less than a month or some other time period. The algorithms may alternatively determine retention based on the actual number of times a particular video segment has been transmitted to customers from a certain content-transfer server 204. In some instances, a sliding window of retention might be used; such a retention algorithm is especially suitable for accommodating broadcast programming. In other embodiments, more sophisticated algorithms that make use of techniques such as neural networks may be used to monitor popularity of video segments and thereby increase the efficiency with which storage space in local video libraries 304 is used.

It should be appreciated that while FIG. 4 has presented a certain order of functions that may be performed in embodiments of the invention that there is no requirement that this order be followed. In alternative embodiments, a different order may be followed, some functions may be omitted, or some additional functions may be performed. For example, in one alternative embodiment, the multiple video segments may be stored in the central video library without having previously performed any frame indexing. Accordingly, when a request for transmission of the selected video segment is processed, frames of the selected video segment may be indexed at the head end 104 after retrieval of the segment and prior to transmission to the node terminal 120.

Figure 5:
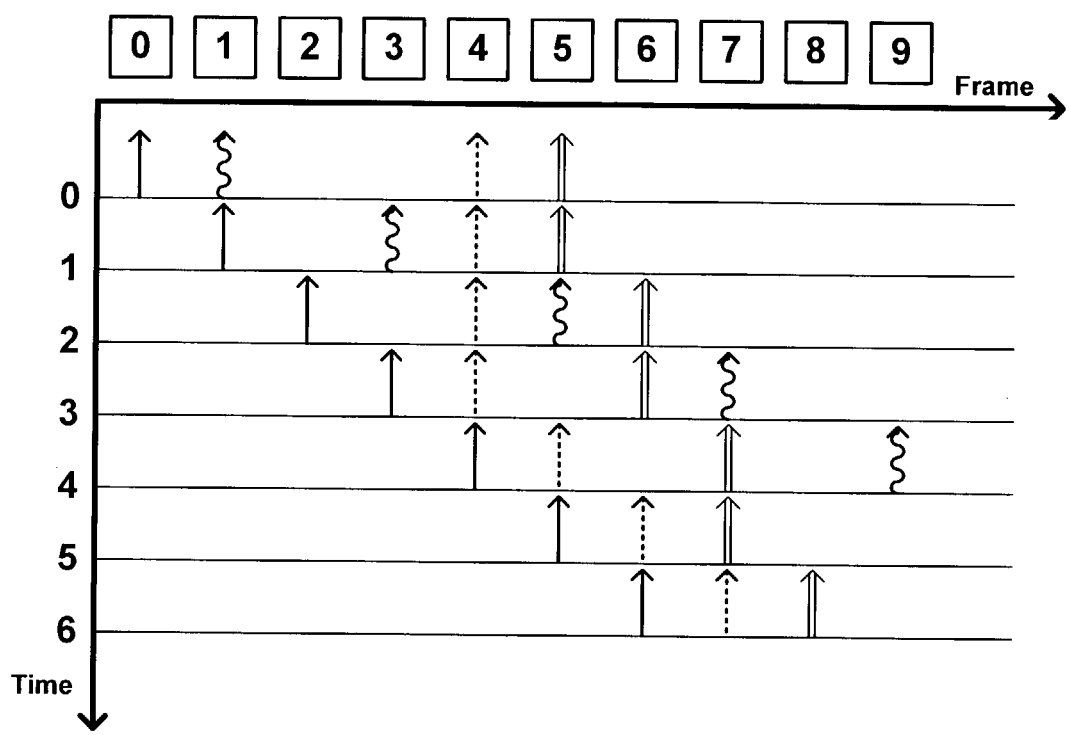
FIG. 5 is a schematic diagram illustrating the use of time shifting in certain embodiments of the invention.

An illustration of the time-shifting aspects that may be used in embodiments of the invention is shown in combination with implementation of exemplary transmission instructions that may be provided by a user in FIG. 5. The horizontal axis in FIG. 5 corresponds to an indexed frame number for a particular video segment; ten frames are designated so that the segment may be considered to be a ten-frame segment, or the designated frames may be viewed as the first ten frames of a longer segment. The vertical axis indicates time periods, with time increasing downwards on the page. Each of the arrows represents transmission of a particular frame at a particular time period, with the form of the different arrows differentiating among transmissions from different buffers 316 to different customers.

The example in FIG. 5 illustrates four different transmissions of a single segment. The first transmission, represented by the solid single-straight-tailed arrows, illustrates a normal playback mode in which the segment begins at frame 0 at time 0 and the subsequent frame is transmitted at each subsequent time period. From the perspective of the user, a selected video segment has been ordered and watched without interruption. The second transmission, represented by dashed-line arrows, illustrates a playback mode in which the segment was begun at time 0 at frame 4 and a freeze-frame instruction was received from the user. The user paused transmission of the segment until time 3 when a resume-play command was issued. Accordingly, the same frame was transmitted for four complete time periods before normal transmission at normal playback speed was resumed. The third transmission, represented by wavy-line arrows, illustrates a fast playback mode in which only every second frame is transmitted for each time period. Such a transmission may be provided in response to a transmission instruction received from the user requesting fast-forwarding of the segment. While the illustration shows transmission at twice normal playback speed, it will be evident that any ratio of actual to normal playback speeds may be implemented. When the ratio is less than one, the transmission corresponds to a slow-motion transmission, such as illustrated with the double-tailed arrows. At half normal playback speed, the same frame is transmitted for two time periods instead of one. Still other types of transmission may similarly be implemented in response to user instructions. For example, a rewind command would be effected by transmitting the frames in reverse order to that shown in FIG. 5.

In some embodiments, the duplication of frame transmission during, say, a slow-motion playback may be avoided by using a subindexing capacity of the buffer 316. In such instances, a given frame is subindexed the frame into a plurality of indexed subframes, which may then be transmitted sequentially in a fashion analogous to that shown for frames in FIG. 5. In the case of slow-motion playback, this permits not only a decrease in the playback speed of the selected video segment, but also a corresponding increase in the number of images that may be presented. The overall effect is to reduce the jumpiness that might otherwise be associated with the slow-motion playback. The use of subindexing is also advantageous for freeze-frame playback, particularly if the user wants selectively to examine sequential subframes of the selected video segment individually.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for providing a selected video segment to customer premises equipment, the method comprising:
   indexing, by an index framer at a head end, objectionable scenes of the selected video segment to permit the objectionable scenes to be bypassed during transmission as part of a parental control feature, the indexing comprising indexing frames of the selected video segment based on a combination of time-based and scene-based indexing;
   receiving a request for transmission of the selected video segment from the customer premises equipment, the customer premises equipment comprising a television set top box;
   transferring, through a television distribution network, a copy of the selected video segment from a central library to a remote local library proximate to the customer premises equipment in response to receiving the request for transmission, the central library being located at the head end and the remote local library being located at a node terminal;
   transferring the copy of the selected video segment from the remote local library to one of a plurality of buffers;
   subindexing, at the node terminal, the indexed frames of the selected video segment into indexed subframes for functions including freeze-frame control;
   mapping the one of the plurality of buffers through a routing network to a port interfaced with the customer premises equipment;
   transmitting the selected video segment from the one of the plurality of buffers through the routing network and the port to the customer premises equipment;
   providing, via the television set top box, playback controls to control playback speed of the selected video segment, the playback controls comprising a fast-forward control and a freeze frame control;
   in response to selection of the fast-forward control, implementing a fast-forward function to increase playback speed of the selected video segment by increasing transmission speed from the one of the plurality of buffers; and
   in response to selection of the freeze frame control, continuously transmitting a specific frame with zero playback speed until a contrary transmission instruction is received.

2. The method recited in claim 1 wherein transmitting the selected video segment is performed substantially contemporaneously with receiving the request for transmission of the selected video segment.

3. The method recited in claim 1 wherein transmitting the selected video segment is performed at a time specified by the request.

4. The method recited in claim 1 further comprising transmitting indexing information for the selected video segment to the central video library.

5. The method recited in claim 1 further comprising:
   receiving a transmission instruction from the customer premises equipment; and modifying transmission of the selected video segment from the one of the plurality of buffers to the customer premises equipment in accordance with the transmission instruction.

6. The method recited in claim 5 wherein:
   the selected video segment comprises an interactive video segment; and
   modifying transmission of the selected video segment comprises selecting one of a plurality of possible contents for transmission in accordance with the transmission instruction.

7. The method recited in claim 5, wherein modifying transmission of the selected video segment comprises selecting one of the indexed subframes for transmission.

8. The method recited in claim 1 further comprising deleting the copy of the selected video segment from the one of the plurality of buffers.

9. The method recited in claim 1 further comprising maintaining the copy of the selected video segment in the remote local library local to the plurality of buffers.

10. The method recited in claim 1 further comprising:
    receiving a second request for transmission of the selected video segment from a second customer premises equipment; and
    transferring a second copy of the selected video segment to a second of the plurality of buffers;
    mapping the second of the plurality of buffers through the routing network to a port interfaced with the second customer premises; and
    transmitting the selected video segment from the second of the plurality of buffers through the routing network and second port to the second customer premises equipment.

11. The method recited in claim 10 wherein transmitting the selected video segment from the second of the plurality of buffers is time-shifted with respect to transmitting the selected video segment from the one of the plurality of buffers.

12. The method recited in claim 1 wherein the selected video segment comprises a selected video program.

13. The method recited in claim 12 further comprising combining the selected video program with a second video program, wherein transferring the copy of the selected video program to the one of the plurality of buffers comprises transferring combination of the selected video program and the second video program to the one of the plurality of buffers.

14. A system for providing a selected video segment to customer premises equipment, the system comprising:
    a local content-transfer server interfaced with a head end having a central video library that houses a copy of the selected video segment, wherein the local content-transfer server is located at a node terminal remote from the central video library and the head end, wherein the local content-transfer server:
    receives, from the head end through a television distribution network, the copy of the selected video segment and an index of objectionable scenes to permit the objectionable scenes to be bypassed during transmission as part of a parental control feature, wherein the index is created by an index framer at the head end that indexes the objectionable scenes based on a combination of time-based and scene-based indexing;
    stores the cony of the selected video segment and the index in a local video library;
    subindexes, with an index module at the node terminal, the indexed frames of the selected video segment into indexed subframes for functions including freeze-frame control;
    generates multiple streams of content using the copy of the selected video segment received from the head end; and
    controls transmission of the multiple streams of content in accordance with transmission instructions received from the customer premises equipment, the customer premises equipment comprising a television set top box;

a routing network interfaced with the local content-transfer server that implements a mapping of the multiple streams of content; and a plurality of ports that transmit the mapped streams of content over a transmission medium, wherein one of the plurality of ports is interfaced with the customer premises equipment with the transmission medium;

wherein the local content-transfer server further:

provides, via the television set top box, playback controls to control playback speed of the selected video segment, the playback controls comprising a fast-forward control and a freeze frame control;

in response to selection of the fast-forward control, implements a fast-forward function to increase playback speed of one of the streams of content by increasing transmission speed of the one of the streams of content; and in response to selection of the freeze frame control, continuously transmits a specific frame with zero playback speed until a contrary transmission instruction is received.

15. The system recited in claim 14 wherein the transmission instructions comprise a request from the customer premises equipment for transmission of the selected video segment.

16. The system recited in claim 14 wherein the transmission instructions comprise a request to modify transmission of the selected video segment.

17. The system recited in claim 14 wherein the routing network comprises a plurality of routing networks, wherein each of the plurality of routing networks is interfaced with one of a plurality of local content-transfer servers.

18. The system recited in claim 14 wherein the local content-transfer server comprises:

the local video library that stores the copy of the selected video segment; and a plurality of buffers that exchange content with the routing network;

wherein the index module loads frames of the selected video segment from the local video library into the buffers.

19. The system recited in claim 18 wherein the index module loads frames into different buffers on a time-shifted basis.

20. A system for providing video programming, the system comprising:

a head end comprising a central video library that houses a plurality of video segments, wherein the head end further comprises an index framer in communication with the central video library that encodes each of the plurality of video segments into indexed frames, including indexing objectionable scenes of the video content to permit the objectionable scenes to be bypassed during transmission as part of a parental control feature, based on a combination of time-based and scene-based indexing;

a plurality of remote node terminals, each of which is remote from the head end and the central video library and exchanges content with a plurality of customer premises equipment, the plurality of customer premises equipment comprising at least one television set top box, wherein each remote node terminal comprises a content transfer server; wherein each content-transfer server comprises a local video library and a plurality of ports; and a television distribution network that interfaces the head end with the plurality of remote node terminals, wherein each of the plurality of local content transfer servers:

receives, from the head end, a copy of a selected video segment and index of objectionable scenes;

stores the copy of the selected video segment and the index in a local video library;

subindexes, with an index module, indexed frames of the selected video segment with an index module into indexed subframes for functions including freeze-frame control;

generates multiple streams of content using the copy of the selected video segment;

controls transmission of the multiple streams of content in accordance with transmission instructions received from the customer premises equipment;

creates a mapping of the multiple streams of content to the plurality of ports;

provides, via the television set top box, playback controls to control playback speed of the selected video segment, the playback controls comprising a fast-forward control and a freeze frame control;

in response to selection of the fast-forward control, implements a fast-forward function to increase playback speed of the selected video segment by increasing transmission speed of the selected video segment; and in response to selection of the freeze frame control, continuously transmits a specific frame with zero playback speed until a contrary transmission instruction is received.

21. The system recited in claim 20 wherein:

the plurality of ports transmit the multiple streams of content over transmission media to the customer premises equipment.

22. The system recited in claim 21 wherein the at least one of the plurality of remote node terminals further comprises a routing network that implements the mapping of the multiple streams of content from the content-transfer server to the plurality of ports.

23. The system recited in claim 22 wherein the at least one of the plurality of remote node terminals further comprises:

a plurality of buffers that exchange content with the routing network;

wherein the index module of the at least one of the plurality of remote node terminals loads frames of the at least one of the plurality of video segments from the local video library into the buffers.

* * * * *